(12) United States Patent
Kray et al.

(10) Patent No.: US 10,041,354 B2
(45) Date of Patent: Aug. 7, 2018

(54) BLADE AND METHOD FOR MANUFACTURING BLADE

(75) Inventors: Nicholas Joseph Kray, Mason, OH (US); Douglas Duane Ward, West Chester, OH (US); Phillip Wayne Rambo, Cincinnati, OH (US); Gregory Carl Gemeinhardt, Park Hills, KY (US)

(73) Assignee: General Electric Company, schenectady, NY (US)

( * ) Notice: Subject to any disclaimer, the term of this patent is extended or adjusted under 35 U.S.C. 154(b) by 468 days.

(21) Appl. No.: 13/232,570

(22) Filed: Sep. 14, 2011

(65) Prior Publication Data
US 2013/0064669 A1    Mar. 14, 2013

(51) Int. Cl.
| | |
|---|---|
| *F01D 5/28* | (2006.01) |
| *F01D 5/14* | (2006.01) |
| *B23P 15/04* | (2006.01) |
| *B23P 15/02* | (2006.01) |
| *F01D 5/30* | (2006.01) |

(52) U.S. Cl.
CPC .............. *F01D 5/147* (2013.01); *B23P 15/02* (2013.01); *B23P 15/04* (2013.01); *F01D 5/282* (2013.01); *F01D 5/3007* (2013.01); *F05D 2250/11* (2013.01); *F05D 2250/292* (2013.01); *Y10T 29/49336* (2015.01); *Y10T 156/1064* (2015.01)

(58) Field of Classification Search
CPC ........ F01D 5/147; F01D 5/282; F01D 5/3007; F05D 2250/292; F05D 2250/11; Y10T 156/1064; Y10T 29/49336; B23P 15/02; B23P 15/04

USPC ......... 416/229 R, 229 A, 230, 241 A, 219 R, 416/220 R, 221, 224, 239, 248; 29/889.71, 419.1; 156/257; 264/139, 264/258

See application file for complete search history.

(56) References Cited

U.S. PATENT DOCUMENTS

| | | | | |
|---|---|---|---|---|
| 3,132,841 | A * | 5/1964 | Wilder, Jr. ................ | 416/219 R |
| 3,720,480 | A * | 3/1973 | Plowman et al. ........ | 416/220 R |
| 3,752,600 | A * | 8/1973 | Walsh et al. .............. | 416/219 R |

(Continued)

FOREIGN PATENT DOCUMENTS

| | | |
|---|---|---|
| JP | 4865507 A | 9/1973 |
| JP | 01282165 A | 11/1989 |

(Continued)

OTHER PUBLICATIONS

Unofficial English Translation of Japanese Office Action issued in connection with corresponding JP Application No. 2012201048 dated Jun. 28, 2016.

(Continued)

*Primary Examiner* — Christopher Verdier
(74) *Attorney, Agent, or Firm* — General Electric Company; Brian Overbeck

(57) ABSTRACT

A method of manufacturing a rotor blade is provided. The method includes forming a preform from a plurality of composite plies, the preform including an airfoil portion and a dovetail portion, removing a cutout portion from the dovetail portion of the preform to define a cutout in the preform, wherein the removing the cutout portion facilitates reducing residual stresses in the preform, and inserting an insert into the cutout formed by the removal of the cutout portion.

5 Claims, 4 Drawing Sheets

(56) References Cited

U.S. PATENT DOCUMENTS

| | | | |
|---|---|---|---|
| 3,756,745 A * | 9/1973 | Alver et al. | 416/230 |
| 4,363,602 A * | 12/1982 | Martin | 416/230 |
| 4,589,176 A | 5/1986 | Rosman et al. | |
| 4,810,167 A * | 3/1989 | Spoltman et al. | 416/229 A |
| 5,100,292 A * | 3/1992 | Matula et al. | 416/220 R |
| 2002/0076541 A1 | 6/2002 | Jarmon et al. | |
| 2005/0084379 A1 | 4/2005 | Schreiber | |
| 2006/0140771 A1 | 6/2006 | Carper et al. | |
| 2009/0220747 A1 | 9/2009 | Karem | |
| 2010/0028594 A1 | 2/2010 | Kray et al. | |
| 2010/0054937 A1 * | 3/2010 | Beckford et al. | 416/2 |
| 2010/0061858 A1 | 3/2010 | Jones | |
| 2010/0143082 A1 | 6/2010 | Wang et al. | |
| 2011/0143082 A1 | 6/2011 | Fritz et al. | |

FOREIGN PATENT DOCUMENTS

| | | | |
|---|---|---|---|
| JP | 02196075 A | 8/1990 |
| JP | 07315947 A | 12/1995 |
| JP | 0867549 A | 3/1996 |
| JP | 2002234777 A | 8/2002 |
| JP | 2006189031 A | 7/2006 |

OTHER PUBLICATIONS

European Search Report & opinion issued in connection with corresponding EP Application No. 12184146.4 dated Aug. 4, 2017.

* cited by examiner

BLADE AND METHOD FOR MANUFACTURING BLADE

BACKGROUND OF THE INVENTION

The field of this disclosure relates generally to blades and, more particularly, to a method and a system for manufacturing blades.

Many known gas turbine engine compressors include rotor blades that extend radially outwardly from a disk or spool to a blade tip to define an airflow path through the engine. In operation, air flowing through the engine imparts significant mechanical stresses (e.g., chordwise bending stresses) on the blades, causing the blades to crack or otherwise fail over time. As such, at least some known rotor blades are formed from plies of composite material using a curing process, adding structural support to the blades.

At least some known compressor rotor blades have a larger cross-sectional area proximate the root of the blade to form a dovetail for coupling the blade to the disk or spool. During the curing process however, residual stresses may be induced in at least some known rotor blades. Such residual stresses increase the likelihood that the blade will fail under the thermal and/or mechanical stresses imparted on the blade during operation of the gas turbine engine, reducing the longevity and durability of at least some known blades.

BRIEF DESCRIPTION OF THE INVENTION

In one aspect, a method of manufacturing a rotor blade is provided. The method includes forming a preform from a plurality of composite plies, the preform including an airfoil portion and a dovetail portion, removing a cutout portion from the dovetail portion of the preform to define a cutout in the preform, wherein the removing the cutout portion facilitates reducing residual stresses in the preform, and inserting an insert into the cutout formed by the removal of the cutout portion.

In another aspect, a rotor blade is provided. The rotor blade includes an airfoil, a dovetail coupled to the airfoil and having a cutout defined therein, the cutout formed by removing a cutout portion from a preform formed from a plurality of composite plies to facilitate reducing residual stresses in the preform, and an insert positioned within the cutout and affixed to the dovetail.

In yet another aspect, a method of manufacturing a component is provided. The method includes forming a preform from a plurality of composite plies, removing a cutout portion from the preform to define a cutout in the preform and to facilitate reducing residual stresses in the preform, and inserting an insert into the cutout formed by the removal of the cutout portion.

DETAILED DESCRIPTION OF THE INVENTION

The following detailed description illustrates exemplary methods and a system for manufacturing components, such as rotor blades, by way of example and not by way of limitation. The description enables one of ordinary skill in the art to make and use the disclosure, and the description describes several embodiments, adaptations, variations, alternatives, and uses of the disclosure, including what is presently believed to be the best mode of carrying out the disclosure. The disclosure is described herein as being applied to a preferred embodiment, namely, methods and a system for manufacturing blades. However, it is contemplated that this disclosure has general application to manufacturing components in a broad range of systems and in a variety of industrial and/or consumer applications.

Figure 1:
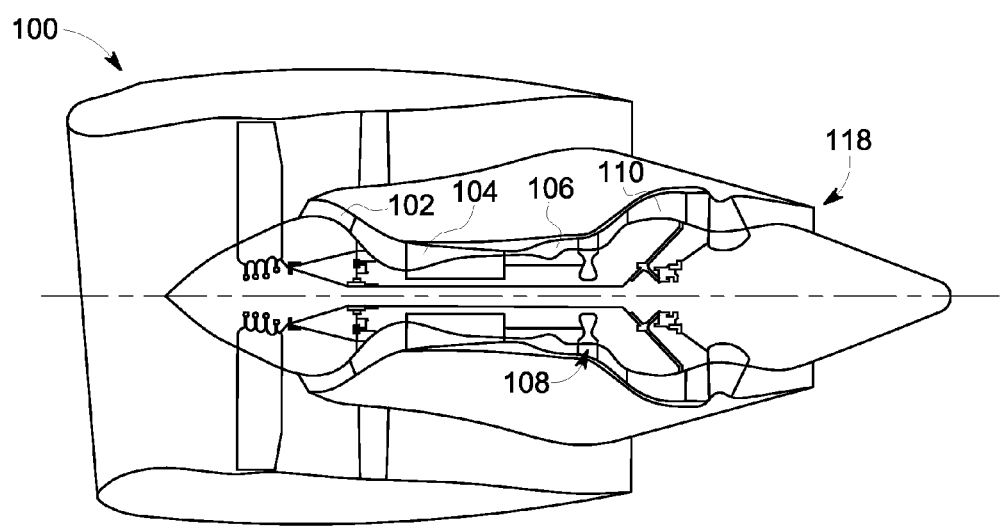
FIG. 1 is a schematic illustration of a gas turbine engine.

FIG. 1 is a schematic illustration of a gas turbine engine 100 including a fan assembly 102, a high pressure compressor 104, and a combustor 106. Engine 100 also includes a high pressure turbine 108 and a low pressure turbine 110. In operation, air flows through fan assembly 102 and compressed air is supplied from fan assembly 102 to high pressure compressor 104. The highly compressed air is delivered to combustor 106. Airflow from combustor 106 drives rotating turbines 108 and 110 and exits gas turbine engine 100 through an exhaust system 118.

Figure 2:
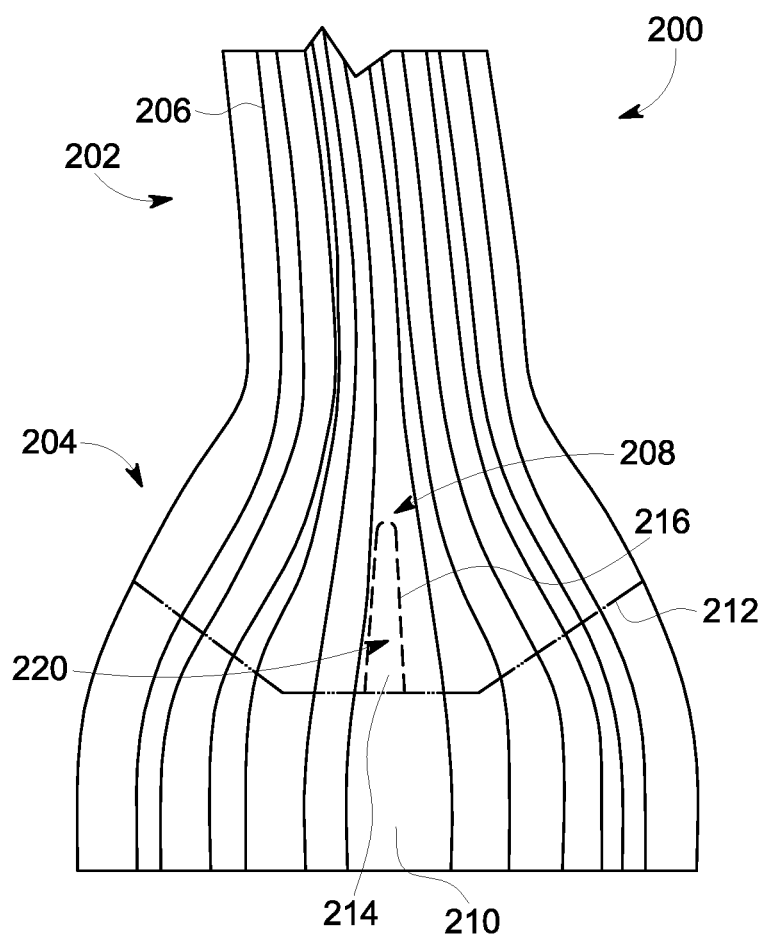
FIG. 2 is a partial cross-sectional view of an exemplary preform from which a rotor blade can be formed.

FIG. 2 is a partial cross-sectional view of an exemplary preform 200 from which a rotor blade (not shown in FIG. 2) can be formed. Preform 200 includes an airfoil portion 202 and a dovetail portion 204. Preform 200 is machined such that airfoil portion 202 becomes an airfoil of the rotor blade and dovetail portion 204 becomes a dovetail of the rotor blade (neither shown in FIG. 2), as described in detail below.

In the exemplary embodiment, preform 200 is formed by stacking plies 206 of composite material in a mold (not shown) and heating the mold (e.g., using a curing process). The mold is at least partially formed in the shape of preform 200. During the curing process, due to internal shrinkage of plies 206 during a cool down phase, residual stresses are generated in preform 200. The internal structure of preform 200, including, for example, the direction and/or orientation of plies 206, may also generate residual stresses. In a component such as preform 200, the residual stresses are generally concentrated at a midpoint 208 of dovetail portion 204, as dovetail portion 204 has a greater cross-sectional area than airfoil portion 202.

To form the rotor blade, an excess portion 210 is removed from preform 200 by cutting along a first cut line 212, and a cutout portion 214 is removed by cutting along a second cutline 216. A machining and/or waterjet process may be used to perform the cutting. Alternatively, cutting may be performed using any method that enables the rotor blade to be formed as described herein. Removing cutout portion 214 creates a cutout 220 in preform 200, and accordingly, the rotor blade.

Figure 3:
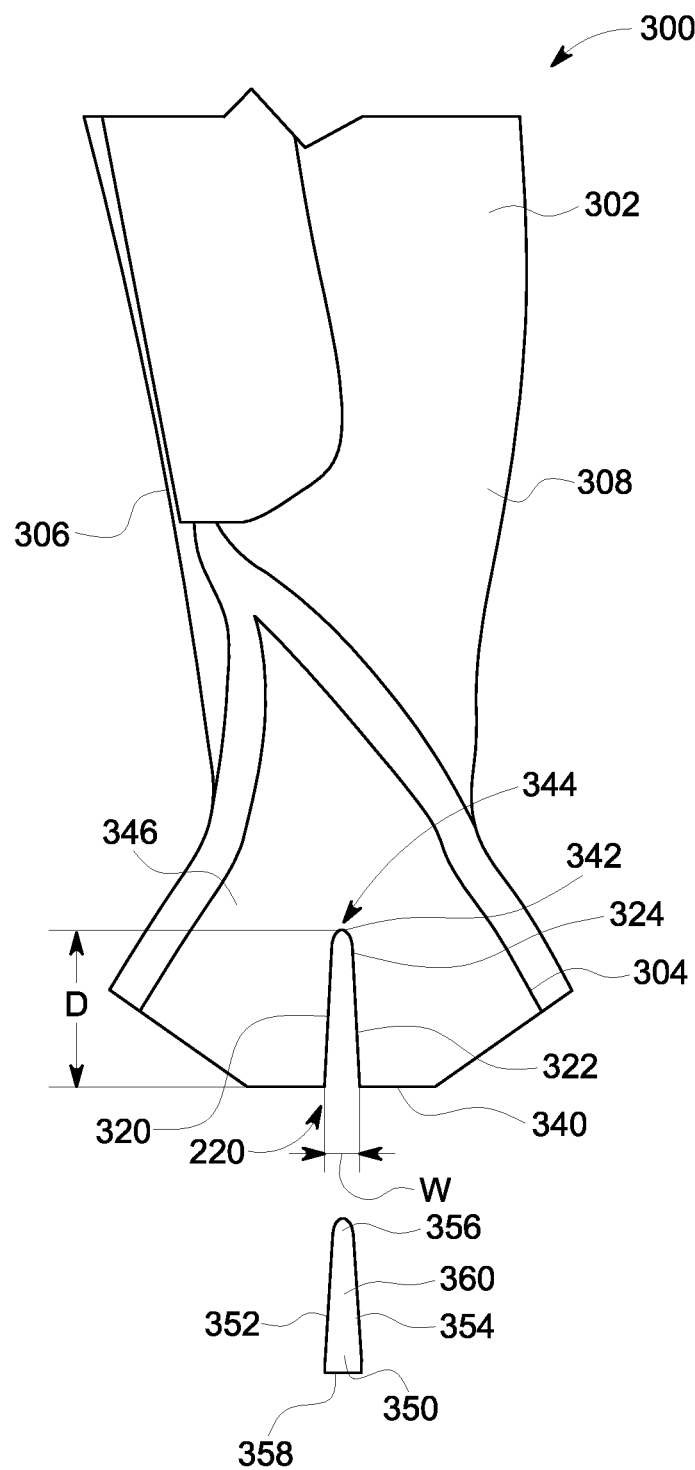
FIG. 3 is a partial side view of an exemplary rotor blade for use with the gas turbine engine shown in FIG. 1.
Figure 4:
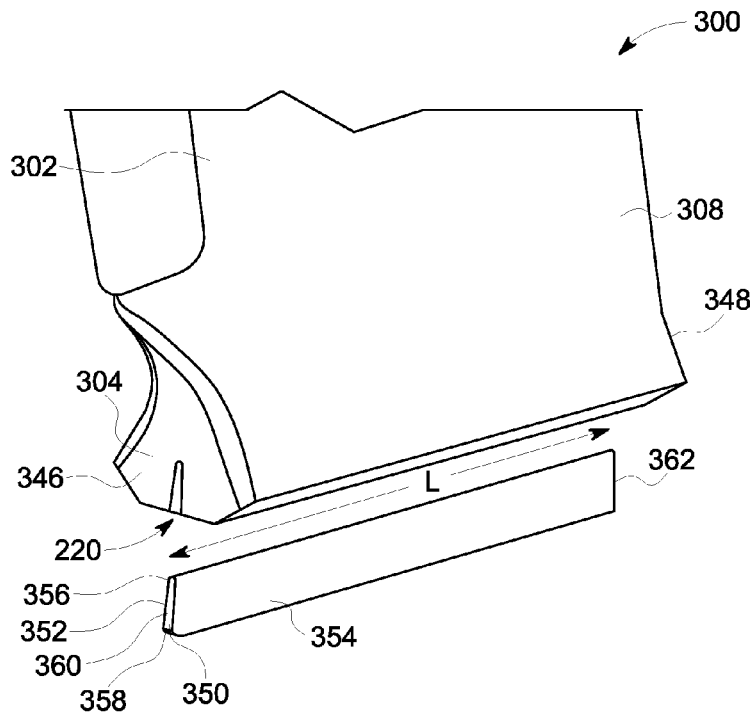
FIG. 4 is a partial perspective view of the rotor blade shown in FIG. 3.

FIG. 3 is a partial side view of a rotor blade 300 that may be formed by machining preform 200 (shown in FIG. 2). FIG. 4 is a partial perspective view of rotor blade 300. Rotor blade 300 may be used with gas turbine engine 100 (shown in FIG. 1). In one embodiment, a plurality of rotor blades 300 form a high pressure compressor stage (not shown) of gas turbine engine 100. Rotor blade 300 includes an airfoil 302 and an integral dovetail 304 for mounting airfoil 302 to a rotor disk (not shown). As explained above, airfoil 302 is formed from airfoil portion 202 of preform 200, and dovetail 304 is formed from dovetail portion 204 of preform 200. Rotor blade 300 includes a first surface 306 and an opposite second surface 308. In the exemplary embodiment, blade 300 has a greater cross-sectional area at dovetail 304 than at airfoil 302 to facilitate coupling blade 300 to the disk at dovetail 304.

Cutout 220 in rotor blade 300 results from the removal of cutout portion 214 from preform 200. Cutout 220 is defined by a first wall 320, a second wall 322, and an arcuate portion 324 connecting first and second walls 320 and 322. Cutout 220 has a depth, D, extending from a base 340 of dovetail 304 to an apex 342. In the exemplary embodiment, apex 342 is located at a midpoint 344 of dovetail 304, approximately halfway between first surface 306 and second surface 308. Cutout 220 extends along an axial length, L, of rotor blade 300 from a first face 346 to a second face 348. Alternatively, cutout 220 may extend only along a portion of axial length L.

In the exemplary embodiment, first and second walls 320 and 322 are tapered from base 340 to arcuate portion 324, such that a width, W, defined between first wall 320 and second wall 322 is greater at base 340 than at arcuate portion 324. Arcuate portion 324 is substantially semi-circular in the exemplary embodiment. Alternatively, cutout 220 may have any dimensions and/or configuration that enables rotor blade 300 to function as described herein.

To maintain the structural integrity of blade 300, an insert 350 is inserted into cutout 220. Insert 350 has substantially the same shape as cutout 220, such that insert 350 substantially fills cutout 220. In the exemplary embodiment, insert 350 includes a first surface 352, an opposite second surface 354, an arcuate top 356, and a substantially planar bottom 358. When insert 350 is inserted into cutout 220, first surface 352 is adjacent first wall 320, second surface 354 is adjacent second wall 322, arcuate top 356 is adjacent arcuate portion 324, and substantially planar bottom 358 forms a substantially planar surface with base 340. Similar to cutout 220, insert 350 has a length equal to the axial length L of blade 300, such that a front face 360 of insert 350 forms a substantially planar surface with first face 346 and a back face 362 of insert 350 forms a substantially planar surface with second face 348.

In the exemplary embodiment, first and second surfaces 352 and 354 are tapered from substantially planar bottom 358 to arcuate top 356 such that the width, W, is greater at substantially planar bottom 358 than at arcuate top 356. Arcuate top 356 is substantially semi-circular in the exemplary embodiment. Alternatively, insert 350 may have any dimensions and/or configuration that enables rotor blade 300 to function as described herein. Insert 350 may be composed of the same material as rotor blade 300 or a different material than rotor blade 300. To secure insert 350, in the exemplary embodiment, insert 350 is affixed to rotor blade 300 using any suitable attachment and/or bonding method.

Figure 5:
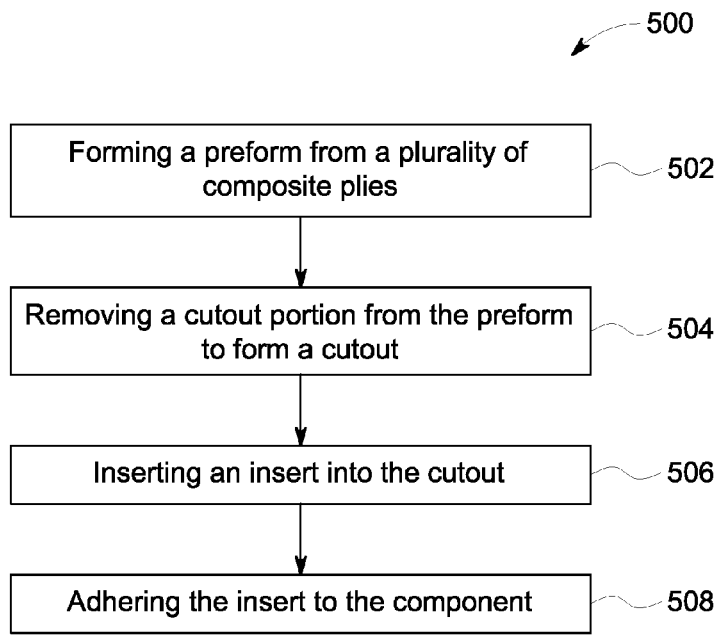
FIG. 5 is a flowchart of an exemplary method for manufacturing a component.

FIG. 5 is a flowchart of an exemplary method 500 for manufacturing a component, such as rotor blade 300. The method includes forming 502 a preform from a plurality of composite plies, such as preform 200 and plies 206. A cutout portion is removed 504 from the preform, such as cutout portion 214. Removing 504 the cutout portion facilitates reducing residual stresses generated in the preform. An insert, such as insert 350, is inserted 506 into a cutout formed by the removal of the cutout portion, such as cutout 220, to facilitate maintaining the structural integrity of rotor blade 300. To secure the insert, the insert is adhered and/or affixed 508 to the component.

The methods and systems described herein enable a rotor blade to be manufactured in a manner that facilitates reducing residual stresses in the blade. Accordingly, the methods and systems described herein facilitate reducing the likelihood that the blade will crack or otherwise fail under thermal or mechanical stress applications. The methods and systems described herein further facilitate increasing a reliability of the blade and thus extending a useful life of the blade.

Exemplary embodiments of methods and systems for manufacturing blades are described above in detail. The methods and systems for manufacturing blades are not limited to the specific embodiments described herein, but rather, components of the methods and systems may be utilized independently and separately from other components described herein. For example, the methods and systems described herein may have other industrial and/or consumer applications and are not limited to practice with rotor blades as described herein. Rather, the present invention can be implemented and utilized in connection with many other industries.

While the invention has been described in terms of various specific embodiments, those skilled in the art will recognize that the invention can be practiced with modification within the spirit and scope of the claims.

What is claimed is:

1. A method of manufacturing a rotor blade comprising:
    forming a preform from a plurality of composite plies, the preform including an airfoil portion and a dovetail portion, the airfoil portion and the dovetail portion forming an airfoil and a dovetail, respectively, of the rotor blade, the rotor blade having opposed first and second surfaces;
    removing a cutout portion from the dovetail portion of the preform by cutting via machining or a waterjet process to define a cutout in the preform having first and second walls extending along an axial length L of the rotor blade from a first face to a second face, the first and second walls being connected by an apex located approximately halfway between the first and second surfaces, and the cutout extending a depth D from a base of the dovetail portion to the apex, wherein the removing the cutout portion facilitates reducing residual stresses in the preform; and
    inserting an insert into the cutout formed by the removal of the cutout portion;
    wherein said insert and said preform are composed of substantially similar materials.

2. A method in accordance with claim 1, wherein inserting an insert comprises inserting an insert having substantially the same shape as the cutout.

3. A method in accordance with claim 1, further comprising affixing the insert to the dovetail portion of the preform via bonding or adhering.

4. A method in accordance with claim 1, wherein the apex forms an arcuate portion connecting the first and second walls.

5. A method in accordance with claim 1, wherein inserting an insert comprises inserting an insert including a first surface, an opposite second surface, an arcuate top, and a substantially planar bottom, the first and second surfaces extending from the substantially planar bottom to the arcuate top.

* * * * *